US005952101A

United States Patent [19]

Nishiguchi et al.

[11] Patent Number: 5,952,101

[45] Date of Patent: Sep. 14, 1999

[54] GRANULAR CHARGING AGENT AND CHARGING METHOD AND IMAGE FORMING METHOD USING THE SAME

[75] Inventors: Yasuo Nishiguchi, Tokyo; Yoshio Ozawa, Mie; Susumu Kikuchi, Tokyo; Hisashi Mukataka, Tokyo; Shigeki Tsukahara, Tokyo; Shinji Yamane, Tokyo, all of Japan

[73] Assignee: Kyocera Corporation, Kyoto, Japan

[21] Appl. No.: 08/896,269

[22] Filed: Jul. 11, 1997

Related U.S. Application Data

[63] Continuation of application No. 08/693,011, Aug. 6, 1996, abandoned, which is a continuation of application No. 08/216,061, Mar. 22, 1994, abandoned.

[30] Foreign Application Priority Data

Mar. 23, 1993 [JP] Japan .................................... 5-089422
Aug. 3, 1993 [JP] Japan .................................... 5-212290

[51] Int. Cl.$^{6}$ ................................ B32B 5/16; B32B 7/02; G03G 15/00

[52] U.S. Cl. .......................... 428/402; 399/174; 399/175; 361/225; 428/212

[58] Field of Search .................................... 428/402, 403, 428/407, 212; 430/106.6, 122; 399/168, 174, 175; 361/225

[56] References Cited

U.S. PATENT DOCUMENTS

| | | | |
|---|---|---|---|
| 4,407,925 | 10/1983 | Liebman | 430/122 |
| 4,414,322 | 11/1983 | Miyakawa et al. | 430/106.6 |
| 4,640,880 | 2/1987 | Kawanishi et al. | 430/106.6 |
| 5,256,513 | 10/1993 | Kawamura et al. | 430/106.6 |

FOREIGN PATENT DOCUMENTS

| | | |
|---|---|---|
| 0492665 | 7/1992 | European Pat. Off. . |
| 06258918 | 9/1994 | Japan . |

OTHER PUBLICATIONS

"New photoreceptor charging method by rubbing with magnetic conductive particles", Nobuji Tetsutani et al., J. Appl. Phys. 62(7), Oct. 1987, pp. 2665–2668.

*Primary Examiner*—Marie Yamnitzky
*Attorney, Agent, or Firm*—Loeb & Loeb LLP

[57] ABSTRACT

A granular charging agent capable of injecting the electric charge into a material to charge the surface of the material when coming in contact with the material with the application of a voltage to the charging agent, comprising magnetic particles which comprise electroconductive magnetic particles and high-resistivity magnetic particles of which resistivity is higher than that of the electroconductive magnetic particles. A granular charging agent may comprise magnetic particles, each magnetic particle comprising an electroconductive surface portion capable of forming a flow path of electric current and a surface portion with a resistivity higher than that of the electroconductive surface portion. In addition, a method of charging a material such as a photoconductor using the above-mentioned granular charging agent is disclosed.

11 Claims, 1 Drawing Sheet

FIGURE
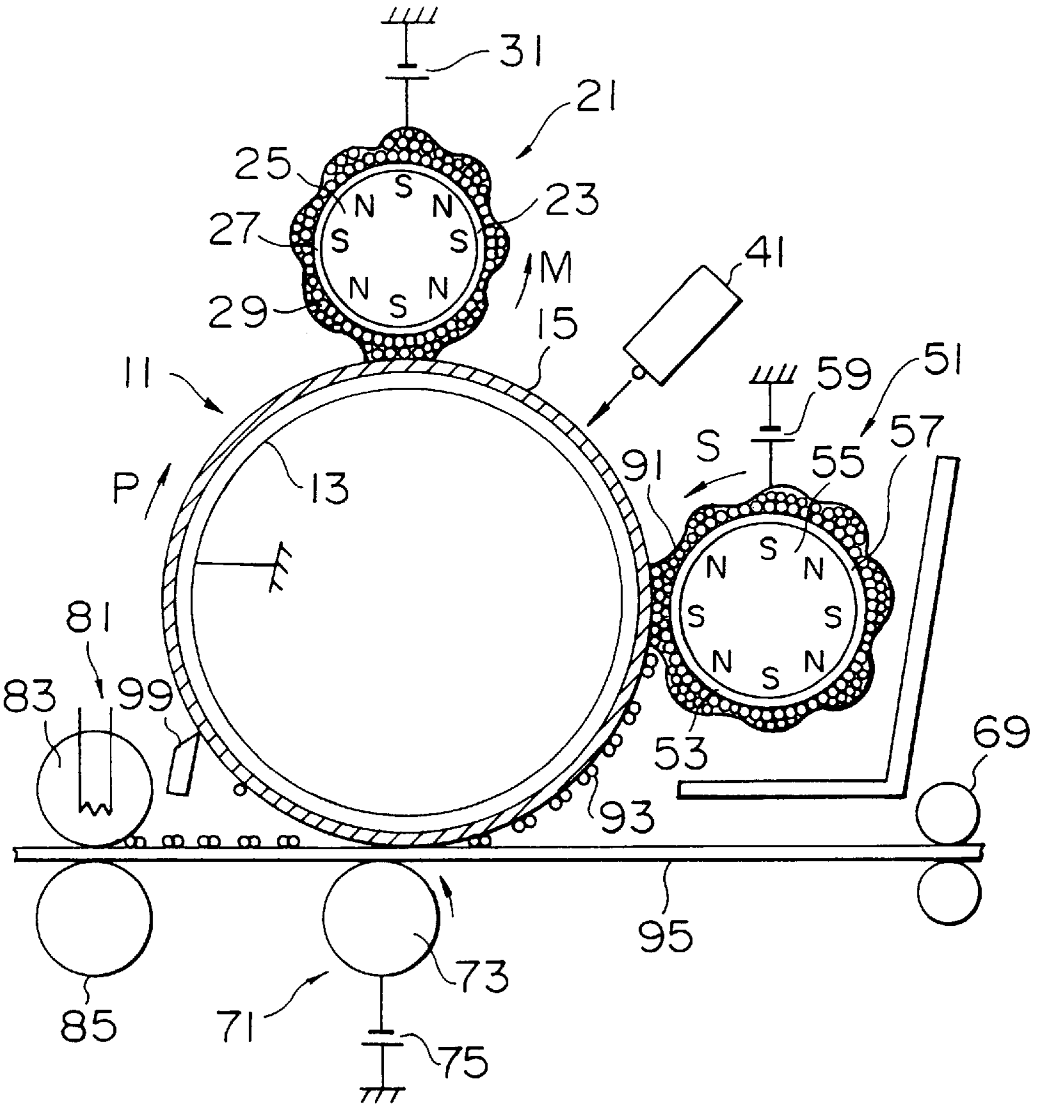

GRANULAR CHARGING AGENT AND CHARGING METHOD AND IMAGE FORMING METHOD USING THE SAME

This is a continuation of application Ser. No. 08/693,011 filed on Aug. 6, 1996, now abandoned, which is itself a continuation of application Ser. No. 08/216,061 filed on Mar. 22, 1994, also abandoned.

BACKGROUND OF THE INVENTION

1. Field of the Invention

The present invention relates to a granular charging agent used in electrically charging a material and a method of electrically charging a material using the same, and more particularly, a method of uniformly charging an electrophotographic photoconductor for use in a variety of image forming apparatus such as a printer and a copying machine using the above-mentioned granular charging agent.

2. Discussion of Background

Since the invention of an electrophotographic process by C. F. Carlson as disclosed in U.S. Pat. No. 2,297,691, various improvements and developments have been made based on the aforementioned Carlson process. According to the electrophotographic image formation method based on the Carlson process, which is now widely employed, image formation is basically carried out in such a manner that the surface of a photoconductor is uniformly charged to a predetermined polarity and the photoconductor thus charged is selectively exposed to the original light images to form electrostatic latent images on the photoconductor. Then, the electrostatic latent images are developed with a developer, so that visible toner images can be obtained on the photoconductor. The visible toner images are then transferred to a sheet of an image-receiving member and fixed thereon.

To uniformly charge the surface of the photoconductor, two kinds of charging methods are conventionally employed. One is a non-contact charging method, such as corona charging; and the other is a contact charging method, such as roller charging, brush charging, charging by use of particles (hereinafter referred to as the particle charging) and triboelectric charging.

In particular, the corona charging is most widely used as the method of electrically charging the photoconductor. However, the corona charging has the drawbacks that the charging level becomes unstable over an extended period of time, ozone generated in the charging process is bad for the health of human body, and a product generated in the charging process is deposited on the surface of the photoconductor.

Of various kinds of contact charging methods, on he other hand, the roller charging method is put to practical use. Although ozone is not generated during the charging process by the roller charging, the roller charging has the problems that there is a risk of the photoconductor being broken by abnormal discharge, it is difficult to uniformly charge the photoconductor, and the environmental stability is poor.

The brush charging is carried out using a flat brush with electroconductive fine fibers which is fixed or freely rotated. However, the fine fibers of the brush are laid flat or stained during the repeated operation, which causes the problem that the charge-imparting capability of the charging brush is decreased.

The particle charging method, which employs electroconductive particles, is carried out in such a manner that electric charge is injected into a material, such as a photoconductor, through a magnetic brush composed of magnetic particles. More specifically, according to the particle charging method, the photoconductor is conventionally charged using the magnetic particles with a volume resistivity of about $10^3$ to $10^7$ Ω·cm, with a bias voltage of as high as 1 kV or more being applied thereto. For example, a charging bias voltage of 2,000 V is applied to magnetic charging particles with a volume resistivity of $10^6$ Ω·cm in the charging process as disclosed in Japanese Laid-Open Patent Application 61-57958. In addition, as disclosed in Japanese Laid-Open Patent Application 59-133569, when magnetic particles with an electrical conductivity of $10^{-7}$ V/cm are used for the charging agent, the photoconductor with a surface potential of 500 V can be obtained in the charging process by the application of a voltage of 600 V to the charging magnetic particles.

However, uniform charging cannot be achieved by the conventional particle charging method. Furthermore, since the granular charging agent (hereinafter also referred to as charging particles) is transferred to the surface of the photoconductor and deposited thereon, it is necessary to provide a blade for removing the charging particles deposited on the photoconductor therefrom downstream from the charging position in the rotational direction of the photoconductor.

In addition, when the electroconductivity of the granular charging agent is increased to improve the capability of charging the photoconductor, the electric charge is concentratedly injected in minute flaws provided in the surface of the photoconductor. This may damage the photoconductor. As previously mentioned, it is very difficult to control the charging capability of the granular charging agent adequately in the conventional particle charging method.

SUMMARY OF THE INVENTION

Accordingly, a first object of the present invention is to provide a granular charging agent capable of electrically charging a material uniformly not transferring to the side of the material when coming in contact with the material, without causing the dielectric breakdown of the material.

A second object of the present invention is to provide a method of electrically charging the surface of a material uniformly using a granular charging agent without causing the dielectric breakdown of the material and the transfer of the granular charging agent to the photoconductor.

A third object of the present invention is to provide an image formation method in which a photoconductor is uniformly charged using a granular charging agent, without causing the dielectric breakdown of the photoconductor and the transfer of the granular charging agent to the photoconductor.

The first object of the present invention can be achieved by a granular charging agent of a two-component type capable of injecting the electric charge into a material to charge the surface of the material when coming in contact with the material with the application of a voltage to the charging agent, comprising magnetic particles which comprise electroconductive magnetic particles and high-resistivity magnetic particles (hereinafter also referred to as high-resistance magnetic particles) of which resistivity is higher than that of the electroconductive magnetic particles.

Alternatively, the first object of the present invention can also be achieved by a granular charging agent of a one-component type capable of injecting the electric charge into a material to charge the surface of the material when coming in contact with the material with the application of a voltage to the charging agent, comprising magnetic particles, each magnetic particle comprising an electroconductive surface portion capable of forming a flow path of electric current and a surface portion with a resistivity higher than that of the electroconductive surface portion.

The second object of the present invention can be achieved by a method of charging the surface of a material comprising the steps of bringing the above-mentioned granular charging agent into contact with the surface of the material, and applying a voltage to the granular charging agent to inject the electric charge into the surface of the material through the granular charging agent. Such a charging method is suitable for charging a photoconductor in the electrophotographic image formation process.

The third object of the present invention can be achieved by an image formation method comprising the steps of charging a drum-shaped electrophotographic photoconductor in the dark as rotating the photoconductor in such a manner that the electric charge is injected into the photoconductor through the above-mentioned granular charging agent which is placed in contact with the surface of the photoconductor under control by a magnetic member, selectively applying a light image to the charged photoconductor to form an electrostatic latent image, developing the electrostatic latent image by a developer to form a toner image on the photoconductor, transferring the toner image to an image-receiving member and fixing the toner image thereon.

BRIEF DESCRIPTION OF THE DRAWING

A more complete appreciation of the present invention and many of the attendant advantages thereof will be readily obtained as the same becomes better understood by reference to the following detailed description when considered in connection with the accompanying drawing, wherein:

FIG. 1 is a schematic diagram which shows an image formation method according to the present invention.

DETAILED DESCRIPTION OF THE PREFERRED EMBODIMENTS

FIG. 1 is a diagram of an image forming apparatus equipped with an electrophotographic photoconductor in which the image formation method according to the present invention is carried out using the granular charging agent.

As shown in FIG. 1, there are situated a charging unit 21, an exposure unit (LED exposure optical system) 41, a development unit 51, an image-transferring unit 71 and an image-fixing unit 81 around a drum-shaped photoconductor 11 which comprises an electroconductive support 13 and a photoconductive layer 15 formed on the support 13. Instead of the drum-shaped photoconductor 11 as shown in FIG. 1, a belt-shaped (sheet-shaped) photoconductor is available in the present invention.

The photoconductor 11 may appropriately be selected from the group consisting of an amorphous silicon (a-Si) based photoconductor, an Se-alloy based photoconductor and an organic material based photoconductor.

According to the image formation method of the present invention, the photoconductor 11 is charged using the charging unit 21 in the dark while the photoconductor 11 is rotated in the direction of an arrow p.

The charging unit 21 comprises a magnetic brush roller 23 (magnetic member) composed of an electroconductive charging sleeve 27 and a magnetic roller 25 included therein, a granular magnetic charging agent 29, and a charging bias source 31. A voltage is applied to the granular magnetic charging agent 29 by the charging bias source 31 through the charging sleeve 27, and the electric charge can be injected into the photoconductor 11 through the granular charging agent 29 to charge the surface of the photoconductor 11 when the magnetic charging agent 29 comes into contact with the photoconductor 11. The granular magnetic charging agent 29 is magnetically connected to the magnetic brush roller 23 to form the so-called magnetic brush, which is rotated in contact with the photoconductor 11 as the rotation of the magnetic brush roller 23 in the direction of an arrow M. It is possible to uniformly charge the surface of the photoconductor 11 by the granular charging agent 29 without rotating the magnetic brush roller 23. Namely, the magnetic particles of the charging agent 29 can be stirred to such a degree that the electric charge can be injected into the photoconductor 11 uniformly by rotating only the photoconductor 11.

A light image is applied to the charged photoconductor 11 by the LED exposure optical system 41. Through the selective exposure to the light image, the surface potential of the light-exposed portion is decreased, so that electrostatic latent images can be obtained on the photoconductor 11.

With the application of the image formation method to a printer taken into consideration, it is designed that the surface potential of a portion on the photoconductor 11 corresponding to an image portion is selectively decreased by the LED exposure optical system 41 in the embodiment as illustrated in FIG. 1. The LED exposure optical system 41 in this embodiment comprises an LED array composed of LED chips which are arranged in a line corresponding to the picture elements, and an image-forming optical system such as Selfoc lens. The laser exposure optical system using a rotational mirror and f-θ lens in combination can be used instead of the LED exposure optical system, and the copy optical system which employs the reflected light from original images can be used as the exposure system in the case where the image formation method is applied to a copying machine. In addition, the light may be applied to the back side of the photoconductor 11 by the rear side exposure system.

The electrostatic latent images formed on the photoconductor 11 are developed to form visible toner images by using the development unit 51.

In the development unit 51, a developer 91 is supplied to the surface of the photoconductor 11 by a development roller 53 which is rotated in the direction of an arrow S. An electroconductive development sleeve 57 of the development roller 53 is connected to a developing bias source 59 which is capable of applying a developing bias voltage across the photoconductor 11 and the development roller 53. A magnetic roller 55 having a plurality of the N and S poles is included in the electroconductive development sleeve 57 of the development roller 53.

In the developing process, the developing bias electric field is generated between the development roller 53 and the photoconductor 11 by the application of a bias voltage from the developing bias source 59. A toner component 93 contained in the developer 91 is selectively attracted to the electrostatic latent images formed on the photoconductor 11, so that visible toner images can be obtained on the photoconductor 11.

The toner component 93 imagewise deposited on the photoconductor 11 is transferred to a sheet of paper 95 by using a transfer roller 73 to which a negative bias voltage is applied by an image-transfer bias source 75. Reference numeral 69 indicates a resist roller for feeding a sheet of paper 95 toward the image-transfer unit 71.

The toner component 93 transferred to the sheet of paper 95 is fixed thereon in such a manner that the sheet of paper 95 is allowed to pass through the gap between an image-fixing roller 83 (heat-application roller) and a pressure-application roller 85. The residual toner which is not transferred to the sheet of paper 95 in the image-transfer process and remains on the photoconductor 11 is removed from the photoconductor 11 by a cleaning blade 99.

The image formation method according to the present invention as previously explained with reference to FIG. 1 is achieved by reversal development using a positively-chargeable photoconductor and a two-component type developer. In addition, the image formation method of the present invention can also be applied to other developing processes such as normal development, using a variety of developers such as a one-component type developer.

The granular charging agent according to the present invention, which is of a two-component type or a one-component type, will now be explained in detail. In the present invention, the magnetic particles for use in the two-component type charging agent may be mixed with the magnetic particles for use in the one-component type charging agent to prepare a granular charging agent of the present invention.

The charging agent according to the present invention comprises magnetic particles, as previously mentioned. The fundamental requirements for the charging agent, such as the average particle diameter, the volume resistivity and the magnetic force, are common to the two-component type charging agent and the one-component type charging agent.

The average particle diameter of the magnetic particles for use in the granular charging agent of the present invention is preferably 60 $\mu$m or less, more preferably in the range from 10 to 60 $\mu$m.

It is preferable that the volume resistivity of the granular charging agent be in the range from $10^2$ to $10^6$ $\Omega\cdot$cm, more preferably in the range from $10^3$ to $10^7$ $\Omega\cdot$cm.

The volume resistivity of the granular charging agent can be measured in such a manner that 1.5 g of the magnetic particles for use in the charging agent are placed in a Teflon®-made cylinder with an inner diameter of 20 mm, having an electrode at the bottom thereof, and a counter electrode with an outer diameter of 20 mm is put on the magnetic particles, with a load of 1 kg being applied to the top portion of the magnetic particles.

It is preferable that the granular charging agent according to the present invention have a magnetic force of 40 emu/g or more, and more preferably in the range from 50 to 100 emu/g, in a magnetic field of 1 kOe.

The two-component type granular charging agent according to the present invention comprises electroconductive magnetic particles and high-resistivity magnetic particles with a resistivity higher than that of the electroconductive magnetic particles.

It is preferable that the volume resistivity of the electroconductive magnetic particles for use in the two-component type charging agent be $10^6$ $\Omega\cdot$cm or less, more preferably in the range from $10^1$ to $10^3$ $\Omega\cdot$cm, further preferably in the range from $10^2$ to $10^4$ $\Omega\cdot$cm.

It is preferable that the volume resistivity of the high-resistivity magnetic particles for use in the two-component type charging agent by $10^6$ $\Omega\cdot$cm or more, more preferably in the range from $10^6$ to $10^{15}$ $\Omega\cdot$cm, further preferably in the range from $10^6$ to $10^{12}$ $\Omega\cdot$cm.

The average particle diameter is preferably 60 $\mu$m or less, and more preferably in the range from 10 to 60 $\mu$m in both the electroconductive magnetic particles and the high-resistivity magnetic particles. In particular, it is optimal that the average particle diameter of the electroconductive magnetic particles be in the range from 5 to 50 $\mu$m, and the average particle diameter of the high-resistivity magnetic particles be in the range from 20 to 60 $\mu$m. In this case, it is desirable that the average particle diameter of the high-resistivity magnetic particles be larger than that of the electroconductive magnetic particles. When the average particle diameter of the high-resistivity magnetic particles is larger than that of the electroconductive magnetic particles, it is possible to prevent the magnetic particles of the charging agent from being freed from the control of the magnetic force exerted by the magnetic member such as the magnetic brush roller 23 shown in FIG. 1 and attracted and transferred to the surface of the photoconductor. In addition, the contact area of the charging particles with the photoconductor is increased, so that the charge-imparting capability of the charging agent is improved. Further, the movement of the electroconductive magnetic particles becomes smooth, so that the charging particles can readily be stirred as the photoconductor is rotated.

In the high-resistivity magnetic particles, it is preferable that the amount ratio of the high-resistivity magnetic particles with a particle diameter of 10 $\mu$m or less be as small as possible, specifically, 5 wt. % or less, more preferably 2 wt. % or less of the total weight of the high-resistivity magnetic particles. The attraction of the charging magnetic particles to the photoconductor can be prevented more efficiently by decreasing the amount ratio of the high-resistivity magnetic particles with a small particle diameter.

In the two-component granular charging agent, it is preferable that the mixing ratio by weight of the electroconductive magnetic particles to the high-resistivity magnetic particles be in the range from (95:5) to (5:95), more preferably in the range from (90:10) to (10:90), and further preferably in the range from (80:20) to (20:80).

If the electric charge is imparted to the photoconductor using the charging agent which consists of the electroconductive magnetic particles, the electric charge is concentrated on the minute flaws provided in the photoconductor to generate numerous pinholes, which impairs the photoconductor. In addition, when the conventional granular charging agent is contaminated by paper dust and residual toner particles deposited on the photoconductor, and dust in the air, the volume resistivity of the charging agent is changed. As a result, not only the sufficient charge quantity cannot be imparted to the photoconductor, but also the electroconductive magnetic particles are easily attracted and transferred to the surface of the photoconductor by electrostatic induction.

The above-mentioned problems can be solved by the two-component type granular charging agent of the present invention comprising the electroconductive magnetic particles and the high-resistivity magnetic particles. The following advantages can be obtained by use of the two-component type charging agent of the present invention:

(1) The electroconductive magnetic particles can be prevented from being attracted and transferred to the surface of the photoconductor.

(2) Even though the granular charging agent is contaminated by paper dust and the residual toner particles, such dust and residual toner particles can electrostatically cling to the high-resistivity magnetic particles. Therefore, the charge-imparting capability of the electroconductive magnetic particles can be ensured.

(3) The accumulation of the electric charge in the minute flaws of the photoconductor can be prevented because the high-resistivity magnetic particles serve as a high-resistivity layer of the charging agent.

The one-component type granular charging agent according to the present invention comprises magnetic particles, each magnetic particle comprising an electroconductive surface portion and a high-resistivity surface portion, with the above-mentioned electroconductive surface portion and high-resistivity surface portion capable of coming in contact with surface portions of other particles. The electroconductive portion and the high-resistivity portion are provided on the surface of the magnetic particle in such a configuration that a disperse phase is formed in a continuous phase.

It is preferable that the volume resistivity of the electroconductive surface portion be $10^7$ Ω·cm or less, more preferably in the range from $10^3$ to $10^6$ Ω·cm, and further preferably in the range from $10^4$ to $10^6$ Ω·cm. On the other hand, the volume resistivity of the high-resistivity surface portion is preferably $10^6$ Ω·cm or more, more preferably in the range from $10^7$ to $10^{15}$ Ω·cm, and further preferably in the range from $10^8$ to $10^{12}$ Ω·cm.

The ratio of the surface area of the electroconductive surface portion to that of the high-resistivity surface portion in the magnetic particles for use in the one-component charging agent is not particularly limited.

As previously mentioned, by providing the electroconductive portion and the high-resistivity portion on the surface of the magnetic particle for use in the one-component type charging agent, the same advantages as those in the case of the two-component charging agent can be obtained. Such advantages cannot be gained if the magnetic particles for use in a one-component type charging agent are homogeneous, even though the volume resistivity of the charging agent is within the above-mentioned range as a whole.

As illustrated in FIG. 1, the granular charging agent 29 according to the present invention is placed under control by a magnetic member such as the magnetic brush roller 23 so as to be sufficiently stirred, so that a charging agent resident portion is formed between the magnetic brush roller 23 and the photoconductor 11. The charging bias voltage is applied to the photoconductor 11 through the granular charging agent 29 constituting the charging agent resident portion, and the electric charge is injected into the photoconductor 11. Thus, the surface of the photoconductor 11 can be uniformly charged. The charging method of the present invention is outstanding for its charging efficiency with respect to the applied voltage. For instance, Table 1 shows the charging efficiencies obtained by the corona charging, the roller charging, and the particle charging according to the present invention when an a-Si based photoconductor is subjected to the charging process.

TABLE 1

| | Charging Efficiency | |
|---|---|---|
| | Applied Voltage | Surface Potential of Photoconductor |
| Corona charging | 6 kV | 500V |
| Roller charging | 1 kV | 500V |
| Particle charging according to the present invention | 200V | 190V |

In the present invention the intensity of the applied charging voltage and the surface potential of the photoconductor to be charged are not particularly limited, but can be appropriately determined depending on the image formation system and the kind of photoconductor to be employed. When the charging method according to the present invention is applied to a low-voltage-application charging system, the charging efficiency becomes significant. Therefore, when the charging method of the present invention is employed, it is preferable that the photoconductor be charged to 500 V or less, more preferably 400 V or less, and further preferably in the range from 30 to 300 V.

The electroconductive magnetic particles for use in the two-component type charging agent according to the present invention can be prepared by the following methods:

(1) Metallic particles such as iron powders are surface-treated by oxidation to control and stabilize the resistivity thereof.

(2) Magnetic finely-divided particles are dispersed and supported in a binder resin, and the thus obtained resin is pulverized and classified to obtain magnetic resin particles with a predetermined diameter. The magnetic resin particles thus obtained are surface-treated to be electroconductive. When the electroconductive magnetic particles prepared by this method is used for the two-component type charging agent of the present invention, a magnetic brush with flexible fibers having a relatively small specific gravity can be obtained although these electroconductive magnetic particles are apt to be attracted to the photoconductor easily if the magnetic force of these particles is weak.

When the particles are surface-treated to be electroconductive as shown in the procedure of the aforementioned method (2), electroconductive finely-divided particles such as carbon black may be fixed on the surface of the particles. In addition, the following methods (3), (4), (5), and (6) are available to impart the electroconductivity to the surface of the magnetic particles:

(3) Coating method: for instance, electroconductive particles with a resistivity of $10^3$ Ω·cm can be obtained by coating an electroconductive resin on the ferrite particles with a resistivity of $10^8$ Ω·cm.

(4) Plating method: an electroconductive metal is plated on the particles to control the surface resistivity of the particles. For example, electrolessly nickel plating can be employed.

(5) Polymerization method: a polymerizable monomer such as ethylene is polymerized on the surface of the particles of a magnetic material, for example, a metal such as iron, and an oxide such as ferrite in the presence of electroconductive finely-divided particles such as carbon black. Thus, an electroconductive layer comprising a synthetic resin and electroconductive finely-divided particles dispersed in the synthetic resin can be provided on the surface of the magnetic particles. This method is described in detail in Japanese Laid-Open Patent Applications 60-106808 and 2-187771.

(6) Thin-film forming method: a thin film of an electroconductive metal or compound is formed on the surface of the magnetic particles by vacuum deposition, sputtering or CVD method to impart the predetermined electroconductivity to the magnetic particles.

Furthermore, the electroconductive magnetic particles for use in the two-component type charging agent can be obtained by making the entire magnetic particles electroconductive in accordance with the following methods (7) and (8):

(7) Fusion atomization method: a variety of metals such as stainless steel, nickel, iron, cobalt, and alloys thereof are subjected to the fusion atomization method to obtain the electroconductive magnetic particles with the predetermined magnetic properties, resistivity and particle diameter.

(8) Sintering method: particles with appropriate electroconductivity and magnetic properties are sintered at high temperature to obtain electroconductive magnetic particles. When necessary, the reduction may be carried out using hydrogen.

For the high-resistivity magnetic particles for use in the two-component type charging agent of the present invention, the following particles can be employed:

(a) Magnetic particles such as ferrite particles can be used as they are.

(b) The magnetic resin particles obtained in the above-mentioned method (2) can be used as they are. In this case, the resistivity can be controlled by selecting the kind of binder resin.

(c) Finely-divided particles with an appropriate resistivity are fixed, or a coating layer with an appropriate resistivity is coated, on the above-mentioned magnetic particles (a) and (b) to control the resistivity.

To prepare the one-component type charging agent of the present invention, an electroconductive portion may be partially formed on the surface of the magnetic particles in accordance with the previously mentioned methods (2), (3), (4) and (6). Alternatively, a plurality of synthetic resin thin films containing magnetic finely-divided particles with high resistivity, and a plurality of synthetic resin thin films containing electroconductive finely-divided particles are laminated to form a laminated sheet. The thus obtained laminated sheet is formed into pellets, which may be pulverized and classified. Thus, the one-component type magnetic charging particles according to the present invention can be obtained.

The granular charging agent according to the present invention comprises magnetic particles comprising an electroconductive surface portion and a high-resistivity surface portion. Further, when the average particle diameter and the volume resistivity of the magnetic particles for use in the charging agent of the present invention are properly controlled, the material such as a photoconductor can be charged uniformly by use of the granular charging agent without generating ozone in the charging process.

Even though there are minute flaws in the surface of the photoconductor, it is possible to prevent the electric charge from being concentratedly injected in the minute flaws. By the charging method of the present invention, as previously mentioned, the electric charge can be imparted to the photoconductor in a stable condition.

Furthermore, even when the granular charging agent according to the present invention is contaminated by the paper dust and the residual toner particles during the repeated operations, the electroconductivity can be maintained to prevent the deterioration of the charge-imparting capability of the charging agent. The charging process can be carried out in a stable condition for an extended period of time.

In addition, the charging voltage can be decreased and the charging efficiency is excellent when the granular charging agent of the present invention is employed.

Other features of the invention will become apparent in the course of the following description of exemplary embodiments, which are given for illustration of the invention and are not intended to be limiting thereof.

EXAMPLE 1

[Preparation of High-Resistivity Magnetic Particles (A)]

Ferrite particles with an average particle diameter of 40 μm, a volume resistivity of $2\times10^8$ Ω·cm and a magnetic force of 59 emu/g in a magnetic field of 1 kOe were prepared as the high-resistivity magnetic particles (A). In the above prepared high-resistivity magnetic particles, the amount ratio of the ferrite particles with a particle diameter of 20 μm or less was 1 wt. % of the total weight of the ferrite particles.

[Preparation of Electroconductive Magnetic Particles (B)]

In accordance with the method described in Japanese Laid-Open Patent Application 60-106808, ethylene monomer was polymerized on the surface of ferrite particles in the presence of carbon black, so that a carbon-black-containing polyethylene resin layer is coated on each ferrite particle. Thus, electroconductive magnetic particles (B) with an average particle diameter of 15 μm, a volume resistivity of $3\times10^2$ Ω·cm and a magnetic force of 55 emu/g in a magnetic field of 1 kOe were prepared.

The above prepared high-resistivity magnetic particles (A) and electroconductive magnetic particles (B) were mixed with a mixing ratio by weight of 8:2 to prepare a two-component type granular charging agent according to the present invention.

Image formation was carried out using an image forming apparatus as shown in FIG. 1 employing an organic photoconductor (OPC). In the image forming procedure, the electric charge was injected into the photoconductor through the above prepared granular charging agent with the application of a charging bias voltage of 200 V thereto. In this case, only the photoconductor was rotated so that the magnetic particles for use in the charging agent were sufficiently stirred. The surface potential of the photoconductor 11 after charging process was measured.

In addition, the image formation was continuously carried out over a long period of time. Then, it was judged from the generation of minute pinholes in the photoconductor whether the photoconductive layer of the photoconductor was broken or not. The results are shown in Table 2.

EXAMPLES 2 TO 4

The same high-resistivity magnetic particles (A) and electroconductive magnetic particles (B) as prepared in Example 1 were mixed with a mixing ratio as shown in Table 2, so that the respective two-component type granular charging agents according to the present invention were obtained in Examples 2 to 4.

Using each granular charging agent, the image formation was carried out in the same manner as in Example 1. The surface potential of the photoconductor was measured after charging, and it was observed whether the photoconductive layer of the photoconductor was broken or not in the course of the continuous image formation procedure. The results are shown in Table 2.

COMPARATIVE EXAMPLE 1

A comparative granular charging agent consisting of the same high-resistivity magnetic particles (A) as employed in Example 1 was prepared.

Using the above prepared comparative granular charging agent, the image formation was carried out in the same manner as in Example 1. The surface potential of the photoconductor was measured after charging, and it was observed whether the photoconductive layer of the photoconductor was broken or not in the course of the continuous image forming procedure. The results are shown in Table 2.

COMPARATIVE EXAMPLE 2

A comparative granular charging agent consisting of the same electroconductive magnetic particles (B) as employed in Example 1 was prepared.

Using the above prepared comparative granular charging agent, the image formation was carried out in the same manner as in Example 1. The surface potential of the photoconductor was measured after charging, and it was observed whether the photoconductive layer of the photoconductor was broken or not in the course of the continuous image forming procedure. The results are shown in Table 2.

TABLE 2

Evaluation Results (1)

| Example No. | Amount Ratio by Weight of (A)/(B) | Surface Potential of Photo-conductor | Breakdown of Photo-conductor |
|---|---|---|---|
| Ex. 1 | 8/2 | 190V | did not occur. |
| Ex. 2 | 6/4 | 191V | did not occur. |
| Ex. 3 | 4/6 | 192V | did not occur. |
| Ex. 4 | 2/8 | 193V | did not occur. |
| Comp. Ex. 1 | 10/0 | 20V | did not occur. |
| Comp. Ex. 2 | 0/10 | 193V | occurred. |

EXAMPLE 5

Using magnetic particles, a one-component type granular agent according to the present invention was prepared in such a fashion that an electroconductive surface portion (a) with a resistivity of $1\times10^2$ Ω·cm and a high-resistivity surface portion (b) with a resistivity of $3\times10^6$ Ω·cm was provided on each magnetic particle. In this case, the ratio of a surface area of the high-resistivity portion (b) to that of the electroconductive portion (a) was set at 8:2. The average particle diameter of these magnetic particles for use in the one-component type granular charging agent was 35 μm and a magnetic force in a magnetic field was 58 emu/g.

Using the above prepared one-component type granular charging agent according to the present invention, the image formation was carried out in the same manner as in Example 1. The surface potential of the photoconductor was measured after charging, and it was observed whether the photoconductive layer of the photoconductor was broken or not in the course of the continuous image forming procedure. The results are shown in Table 3.

EXAMPLES 6 TO 8

In the same magnetic particles as prepared in Example 5, the ratio of a surface area of the high-resistivity surface portion (b) to that of the electroconductive surface portion (a) was changed as shown in Table 3, so that the respective one-component type granular charging agents according to the present invention were obtained in Examples 6 to 8.

Using each granular charging agent, the image formation was carried out in the same manner as in Example 1. The surface potential of the photoconductor was measured after charging, and it was observed whether the photoconductive layer of the photoconductor was broken or not in the course of the continuous image formation procedure. The results are shown in Table 3.

COMPARATIVE EXAMPLE 3

Using the same magnetic particles as prepared in Example 5, a comparative granular charging agent comprising no electroconductive surface portion (a) was prepared.

The image formation was carried out using the above prepared comparative granular charging agent in the same manner as in Example 1. The surface potential of the photoconductor was measured after charging, and it was observed whether the photoconductive layer of the photoconductor was broken or not in the course of the continuous image forming procedure. The results are shown in Table 3.

COMPARATIVE EXAMPLE 4

Using the same magnetic particles as prepared in Example 5, a comparative granular charging agent comprising no high-resistivity surface portion (b) was prepared.

The image formation was carried out using the above prepared comparative granular charging agent in the same manner as in Example 1. The surface potential of the photoconductor was measured after charging, and it was observed whether the photoconductive layer of the photoconductor was broken or not in the course of the continuous image forming procedure. The results are shown in Table 3.

TABLE 3

Evaluation Results (2)

| Example No. | Ratio of Surface Area of (b) to that of (a) | Surface Potential of Photo-conductor | Breakdown of Photo-conductor |
|---|---|---|---|
| Ex. 5 | 8/2 | 153V | did not occur. |
| Ex. 6 | 6/4 | 182V | did not occur. |
| Ex. 7 | 4/6 | 190V | did not occur. |
| Ex. 8 | 2/8 | 192V | did not occur. |
| Comp. Ex. 3 | 10/0 | 20V | did not occur. |
| Comp. Ex. 4 | 0/10 | 193V | occurred. |

What is claimed is:

1. A granular charging agent for injecting electric charges into a material to charge a surface of the material when coming in contact with the surface with the application of a voltage to the charging agent, the charging agent comprising:

a plurality of electroconductive magnetic particles having a first resistivity and a first average particle diameter; and a plurality of resistive magnetic particles having a second resistivity higher than the first resistivity and a second average particle diameter larger than the first average particle diameter;

wherein the electroconductive magnetic particles and the resistive magnetic particles interact during charging to prevent the magnetic particles from being transferred to the surface of the material.

2. The granular charging agent of claim 1, wherein at least one of the plurality of electroconductive magnetic particles and the plurality of resistive magnetic particles has an average particle diameter not greater than 60 μm.

3. The granular charging agent of claim 1, wherein at least one of the plurality of electroconductive magnetic particles and the plurality of resistive magnetic particles has an average particle diameter in a range between 10 and 60 μm.

4. The granular charging agent of claim 1, wherein the plurality of electroconductive magnetic particles has an average particle diameter in a range between 5 and 50 μm.

5. The granular charging agent of claim 1, wherein the plurality of resistive magnetic particles has an average particle diameter in a range between 20 and 60 μm.

6. The granular charging agent of claim 1, wherein the plurality of resistive magnetic particles defines a total weight, and wherein the resistive magnetic particles having a particle diameter not greater than 10 $\mu$m is not greater than 5% by weight of the total weight of the resistive magnetic particles.

7. The granular charging agent of claim 1, wherein the plurality of electroconductive particles defines a first weight, wherein the plurality of resistive magnetic particles defines a second weight, and wherein the ratio of the first weight to the second weight is in a range between 95:5 and 5:95.

8. The granular charging agent of claim 1, wherein the granular charging agent defines a volume resistivity in a range between $10^2$ and $10^8$ $\Omega\cdot$cm.

9. The granular charging agent of claim 1, wherein the plurality of electroconductive magnetic particles defines a volume resistivity not greater than $10^6$ $\Omega\cdot$cm.

10. The granular charging agent of claim 1, wherein the plurality of resistive magnetic particles defines a volume resistivity not less than $10^6$ $\Omega\cdot$cm.

11. The granular charging agent of claim 1, wherein the plurality of electroconductive magnetic particles defines a magnetic force of not less than 40 emu/g in a magnetic field of 1 kOe.

* * * * *